US012052559B2

United States Patent
Teevens et al.

(10) Patent No.: US 12,052,559 B2
(45) Date of Patent: Jul. 30, 2024

(54) APPARATUS AND METHOD TO PROVIDE SITUATIONAL AWARENESS USING POSITIONAL SENSORS AND VIRTUAL ACOUSTIC MODELING

(71) Applicant: Google LLC, Mountain View, CA (US)

(72) Inventors: Perry Teevens, Danville, CA (US); Robert J. E. Dalton, Jr., San Francisco, CA (US); David E. Romblom, San Mateo, CA (US); Peter G. Otto, San Diego, CA (US); Elliot M. Patros, San Diego, CA (US)

(73) Assignee: Google LLC, Mountain View, CA (US)

( * ) Notice: Subject to any disclaimer, the term of this patent is extended or adjusted under 35 U.S.C. 154(b) by 382 days.

(21) Appl. No.: 17/295,158

(22) PCT Filed: Nov. 20, 2019

(86) PCT No.: PCT/US2019/062378
§ 371 (c)(1),
(2) Date: May 19, 2021

(87) PCT Pub. No.: WO2020/106818
PCT Pub. Date: May 28, 2020

(65) Prior Publication Data
US 2022/0014865 A1    Jan. 13, 2022

Related U.S. Application Data

(60) Provisional application No. 62/770,352, filed on Nov. 21, 2018.

(51) Int. Cl.
*H04S 7/00* (2006.01)
*B60K 35/00* (2024.01)
(Continued)

(52) U.S. Cl.
CPC .............. *H04S 7/302* (2013.01); *B60K 35/00* (2013.01); *B60K 35/60* (2024.01); *B60W 50/14* (2013.01);
(Continued)

(58) Field of Classification Search
CPC .. H04S 7/302; H04S 2400/11; H04S 2400/01; H04S 2420/01; B60W 50/14;
(Continued)

(56) References Cited

U.S. PATENT DOCUMENTS 6,996,244 B1 *   2/2006   Slaney ................... H04S 1/002
                                                          381/303
7,274,288 B2      9/2007   Nagata
(Continued)

FOREIGN PATENT DOCUMENTS

DE     112013005207 T5     9/2015
DE     102014205734 A1    10/2015
(Continued)

OTHER PUBLICATIONS

International Search Report and Written Opinion for International Application No. PCT/US2019/062378 dated Feb. 3, 2020. 8 pages.
(Continued)

*Primary Examiner* — Vivian C Chin
*Assistant Examiner* — Douglas J Suthers
(74) *Attorney, Agent, or Firm* — Kilpatrick Townsend & Stockton LLP

(57) ABSTRACT

A situation awareness system is provided and includes sensors configured to sense an object and generate signals of the sensed object. An identification and classification module is in communication with the sensors. The identification and classification module is configured to identify the sensed object and determine the position, speed and direction of each sensed object. A sound synthesis module is in commu-
(Continued)

nication with the identification and classification module. The sound synthesis module is configured to create sounds for the sensed object and further configured to create a binaural virtual acoustic model for the sensed object. The binaural virtual acoustic model is used to position the sensed object in virtual space at a location corresponding to its location in real space. One or more beam forming arrays is in communication with the sound synthesis module and configured to delivery sound. The delivered sound increases the situational awareness of a vehicle operator.

13 Claims, 6 Drawing Sheets

(51) Int. Cl.
  *B60K 35/60* (2024.01)
  *B60W 50/14* (2020.01)
  *H04R 5/02* (2006.01)
(52) U.S. Cl.
  CPC ....... *H04R 5/023* (2013.01); *B60W 2050/143* (2013.01); *B60W 2400/00* (2013.01); *B60W 2420/408* (2024.01); *B60W 2554/80* (2020.02); *H04R 2499/13* (2013.01); *H04S 2400/01* (2013.01); *H04S 2420/01* (2013.01)
(58) Field of Classification Search
  CPC ....... B60W 2050/143; B60W 2400/00; B60W 2420/52; B60W 2554/80; H04R 5/023; H04R 2499/13; B60K 35/00; B60K 37/02
  USPC .................................................. 381/302, 86
  See application file for complete search history.

(56) References Cited

U.S. PATENT DOCUMENTS

| | | | |
|---|---|---|---|
| 2005/0271212 A1* | 12/2005 | Schaeffer | H04S 7/304 |
| | | | 381/17 |
| 2007/0092100 A1* | 4/2007 | Holmi | H04R 5/023 |
| | | | 381/388 |
| 2009/0136048 A1 | 5/2009 | Yoo et al. | |
| 2009/0243880 A1 | 10/2009 | Kiuchi | |
| 2012/0133769 A1 | 5/2012 | Nagamine et al. | |
| 2014/0064526 A1* | 3/2014 | Otto | H04R 5/04 |
| | | | 381/300 |

FOREIGN PATENT DOCUMENTS

| | | |
|---|---|---|
| DE | 102016114413 A1 | 3/2018 |
| DE | 102018102541 A1 | 8/2018 |
| DE | 102017203515 A1 | 9/2018 |
| EP | 3 094 114 A1 | 11/2016 |
| WO | 2007/049995 A1 | 5/2007 |

OTHER PUBLICATIONS

International Preliminary Report on Patentability for International Application No. PCT/US2019/062378 dated Jun. 3, 2021. 8 pages.

* cited by examiner

APPARATUS AND METHOD TO PROVIDE SITUATIONAL AWARENESS USING POSITIONAL SENSORS AND VIRTUAL ACOUSTIC MODELING

RELATED APPLICATIONS

This application is a national phase entry under 35 U.S.C. § 371 of International Application No. PCT/US2019/062378, filed Nov. 20, 2019, which claims the benefit of U.S. Provisional Patent Application No. 62/770,352, filed Nov. 21, 2018, the entire disclosures of which are incorporated herein by reference.

BACKGROUND

An operator (driver) of a vehicle is exposed to multiple stimuli. The stimuli can originate from inside the vehicle and the stimuli can originate from outside the vehicle. Non-limiting examples of internal stimuli include music from a radio, turn signal sounds, engine noises, voices, creaks and squeaks and the like. Non-limiting examples of external stimuli include sounds from other vehicles, sirens, horns and the like. In certain instances, the internal and external stimuli can affect the situational awareness of the operator.

In certain instances, the situational awareness of a vehicle operator may be improved by adding stimuli to warnings, events, objects, situations, and the like, that may otherwise go unnoticed by the vehicle operator. As one non-limiting example, a sound-based warning concerning the potential for ice on the road at night, which may be hard to discern otherwise, would improve situational awareness. As another non-limiting example, an audible notification that a red stop light has turned green would improve situational awareness.

In other instances, the situational awareness of a vehicle operator may be improved by attenuating, cancelling, reducing the noticeability of a distracting stimuli. As one non-limiting example, driving over rough surfaces such as gravel, stone, and the like can create noise that may be distracting to the vehicle operator and also may impair the vehicle operator's ability to notice stimuli that are more important.

In certain instances, the situational awareness of a vehicle operator may be improved by augmenting or changing, the sound of naturally occurring stimuli that the vehicle operator may or may not normally notice. As one non-limiting example, a plurality of sounds emanating from an internal combustion engine that indicate the engine oil may need to be changed could be accompanied by a sound-based warning, thereby improving the situational awareness of the vehicle operator.

In other instances, the situational awareness of a vehicle operator may be improved by setting the location of different types or classes of stimuli in the virtual acoustic scene. The location of the stimuli can be set automatically or manually. As one non-limiting example, driving directions can be automatically located in the direction of an upcoming vehicle turn. As another non-limiting example, an audio-based telephone call can be positioned in the direction toward the passenger's seat.

It would be advantageous if situational awareness of a vehicle operator could be improved.

SUMMARY

It should be appreciated that this Summary is provided to introduce a selection of concepts in a simplified form, the concepts being further described below in the Detailed Description. This Summary is not intended to identify key features or essential features of this disclosure, nor is it intended to limit the scope of the apparatus and method to provide situational awareness using positional sensors and virtual acoustic modeling.

The above objects as well as other objects not specifically enumerated are achieved by a situation awareness system configured to create a binaural virtual acoustic model of a sensed object. The situation awareness system includes one or more sensors configured to sense an object and generate signals of the sensed object. An identification and classification module is in communication with the one or more sensors. The identification and classification module is configured to identify the sensed object and is further configured to determine the position, speed and direction of each sensed object. A sound synthesis module is in communication with the identification and classification module. The sound synthesis module is configured to create sounds for the sensed object and further configured to create a binaural virtual acoustic model for the sensed object. The binaural virtual acoustic model is used to position the sensed object in virtual space at a location corresponding to its location in real space. One or more beam forming arrays is in communication with the sound synthesis module and configured to delivery sound. The sound delivered by the one or more beam forming arrays increases the situational awareness of a vehicle operator.

The above objects as well as other objects not specifically enumerated are also achieved by a method of operating a situation awareness system. The method including the steps of sensing an object using one or more sensors, the one or more sensors generating a sensing signal, analyzing sensing signal to identify the object, determining of the position, speed and direction of the object, creating one or more sounds for the object, sending positional information for the object to a virtual acoustic model, positioning the object in virtual space at a location corresponding to its location in real space, creating signals for the positioned objects or sound sources for delivery to beam forming arrays and delivering the signals to the beam-forming arrays.

Various objects and advantages of the apparatus and method to provide situational awareness using positional sensors and virtual acoustic modeling will become apparent to those skilled in the art from the following detailed description, when read in light of the accompanying drawings.

DETAILED DESCRIPTION

Figure 1:
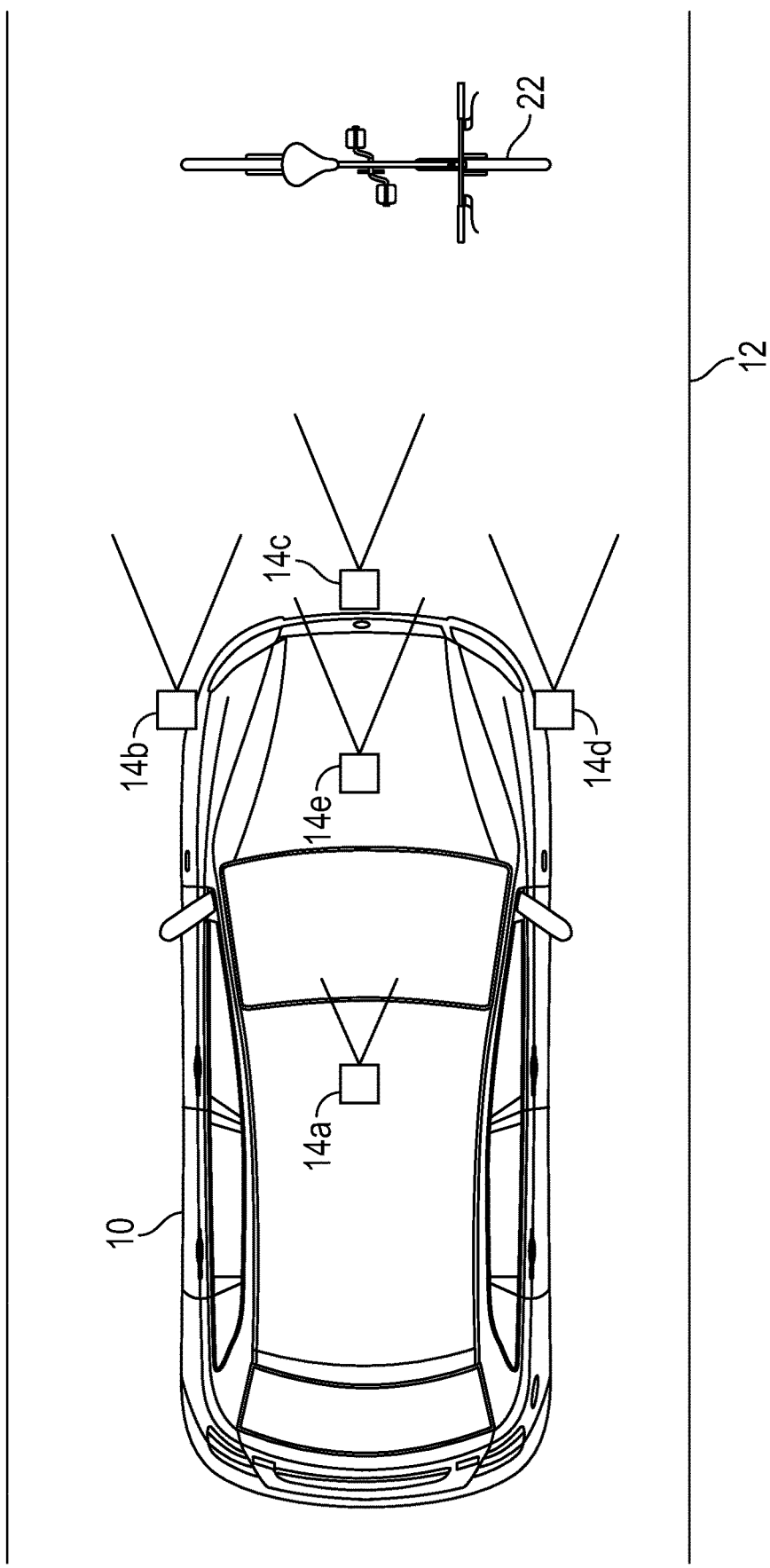
FIG. 1 is a plan view of a vehicle equipped with a situation awareness system.

The apparatus and method to provide situational awareness using positional sensors and virtual acoustic modeling (hereafter "situational awareness system") will now be described with occasional reference to specific embodiments. The situational awareness system may, however, be embodied in different forms and should not be construed as limited to the embodiments set forth herein. Rather, these embodiments are provided so that this disclosure will be thorough and complete, and will fully convey the scope of the situational awareness system to those skilled in the art.

Unless otherwise defined, all technical and scientific terms used herein have the same meaning as commonly understood by one of ordinary skill in the art to which the situational awareness system belongs. The terminology used in the description of the situational awareness system herein is for describing particular embodiments only and is not intended to be limiting of the situational awareness system. As used in the description of the situational awareness system and the appended claims, the singular forms "a," "an," and "the" are intended to include the plural forms as well, unless the context clearly indicates otherwise.

Unless otherwise indicated, all numbers expressing quantities of dimensions such as length, width, height, and so forth as used in the specification and claims are to be understood as being modified in all instances by the term "about." Accordingly, unless otherwise indicated, the numerical properties set forth in the specification and claims are approximations that may vary depending on the desired properties sought to be obtained in embodiments of the situational awareness system. Notwithstanding that the numerical ranges and parameters setting forth the broad scope of the situational awareness system are approximations, the numerical values set forth in the specific examples are reported as precisely as possible. Any numerical values, however, inherently contain certain errors necessarily resulting from error found in their respective measurements.

The description and figures disclose a situational awareness system for use in a vehicle. Generally, the situational awareness system uses sensors to create a binaural virtual acoustic model of a sensed object. The binaural virtual acoustic model locates the object in virtual space at a location corresponding to its location in real space. The binaural virtual acoustic model is transmitted to the driver of the vehicle to provide enhanced situational awareness.

The term "situational awareness", as used herein, is defined to mean the perception of environmental elements and events with respect to time or space. The term "situational awareness" can include the comprehension of the environmental elements and events, and further can include projections of their future status.

A binaural virtual acoustic display can be generated in part by a plurality of loudspeakers configured together with the intent of reproducing a binaural audio signal at the ears of a vehicle operator. The particular arrangement of speakers may depend on context, and be designed according to the goal of improving certain qualities of the reproduced audio signal for the operator and bystanding listeners. Non-limiting examples of such a loudspeaker system include a beam-forming system, for example a loudspeaker array, as well as a multi-channel configuration, for example a stereo loudspeaker system.

An active noise cancellation system can be generated in part by one or a plurality of loudspeakers configured together with the intent of attenuating, modifying, or amplifying a physical sound source originating from inside, outside, or on the vehicle. The particular arrangement of speakers may depend on context, and be designed according to the goal of improving certain qualities of a virtual acoustic display, of a general acoustic environment for the operator and bystanding listeners, or to the goal of improving the physical acoustic interactions between a loudspeaker system and the vehicle itself. Non-limiting examples of such a loudspeaker system include a beam-forming system, for example a loudspeaker array, a multi-channel configuration, for example a stereo loudspeaker system, or individual, standalone loudspeakers.

The physical components of a beam-forming or multi-channel system (hereafter referred to as just a beam-forming system) include any loudspeaker system used to produce different audio signals at a listener's ears. Sensors may be added to the beam-forming system to improve its ability to deliver accurate audio signals to a target listener. Non-limiting examples include tracking the position of target listeners, tracking physical features in the vehicle, as well as monitoring the acoustic content in the environment. The software components of a beam-forming system may include algorithms for beam-forming or spatial filter generation, amplitude-panning, delay-panning, and software for interpreting sensor data. These may either be generated or interpolated in real time according to, for example, a head tracking system. Other resources required by a beam-forming system may include pre-computed beam-forming or spatial filters. Spatial filters may include physical head-related transfer function compensation to improve the spatial impression of the binaural image.

A beam-forming system may utilize the physical acoustic properties of objects in the sound field, including the vehicle operator, features in the vehicle like windows or seats, as well as modifications to the loudspeakers themselves that assist in the creation of desired acoustic responses. For example, a stereo loudspeaker pair may be placed in the headrest behind the operator's ears so that their head assists in acoustic shadowing or propagation delay.

The interaction between two or more different types of beam-forming systems may contribute towards an improved spatial impression, which would improve situational awareness. For example, the combination of a beam-forming loudspeaker array for higher frequencies and a stereo loudspeaker system in the headrest for lower frequencies may create a higher-fidelity spatial impression for a vehicle operator than an array alone.

A binaural virtual acoustic display is generated in part by one or several signal processing techniques used to impart localization cues into an audio signal, so that if they are played into each ear, create the impression of directionality. Non-limiting examples of these processes include binaural mannequin recording techniques, binaural synthesis from models or recorded data, as well as filtering with binaural filters.

The beam-forming system as described is controlled by the sound synthesis module insofar as it receives one or more channels of audio as input, so-called multi-channel input. The sound synthesis module may be requested by its sensors, software, or users to deliver multiple types of audio simultaneously. In various instances, one or multiple of these parties may control none, part, or all of the sound synthesis module. For example, a user may in some contexts have the ability to override functionality provided by software, or vice versa. The ability of the sound synthesis module to use software to prioritize tasks that may have conflicting impact on the situational awareness of a vehicle operator may depend on context, and be designed according to the goal of improving certain qualities of the reproduced audio signal for the operator or bystanding listeners. Non-limiting examples of multi-channel input include audio streams from media devices carried by vehicle operators and passengers such as phones, as well as from media devices embedded in the vehicle, including from radio or entertainment systems.

Figure 2:
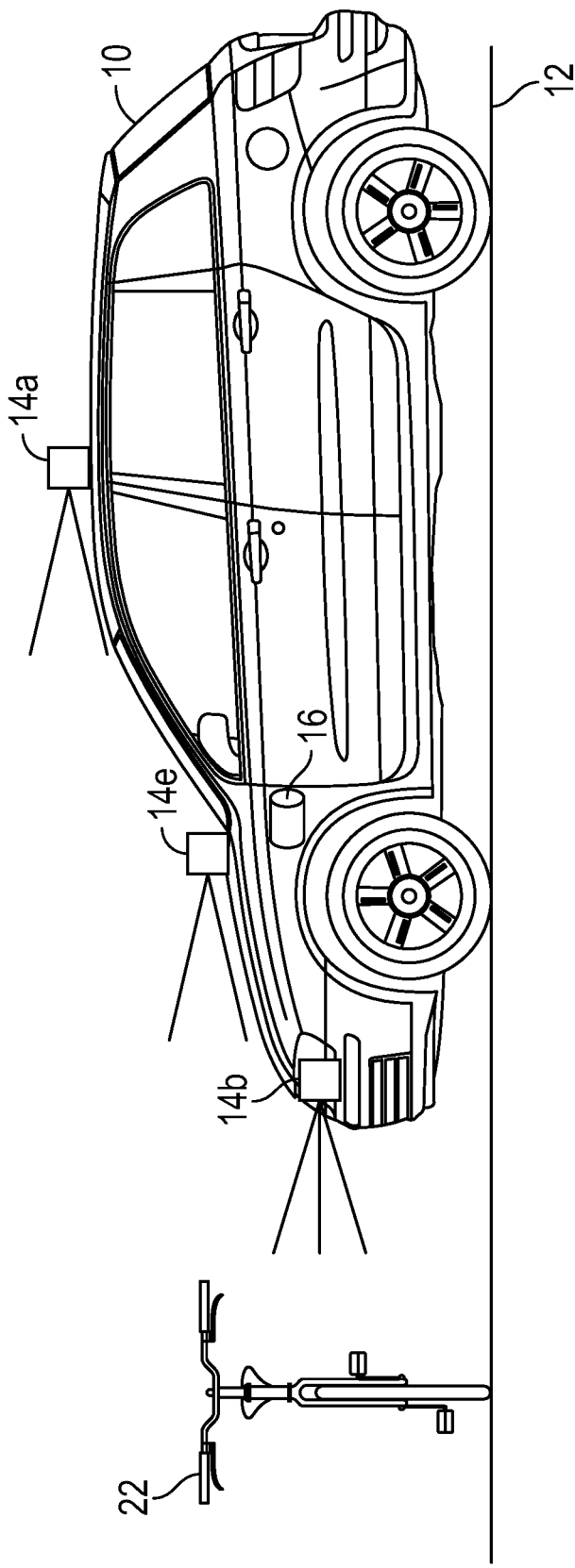
FIG. 2 is a side view of a vehicle equipped with the situation awareness system of FIG. 1.

Referring now to the drawings, there is illustrated in FIGS. 1 and 2 a schematic and simplified view of a vehicle 10. In the illustrated embodiment, the vehicle 10 is an automobile. However, in other embodiments, the vehicle 10 can have other forms, including the non-limiting examples of trucks, trains, boats, subway cars, trams, trolleys and the like.

Referring again to FIGS. 1 and 2, the vehicle 10 is navigating a roadway 12. In the illustrated embodiment, the roadway 12 is a paved road. In alternate embodiments, the roadway 12 can have other forms, including the non-limiting examples of a dirt road, stone or gravel covered road, train track, river and the like.

Referring again to FIGS. 1 and 2, the vehicle 10 includes a plurality of sensors, shown schematically at 14a-14e. The sensors 14a-14e are configured to sense the environment external to the vehicle 10. The sensors 14a-14e are also configured to generate signals as external environmental conditions and factors are sensed. The sensors 14a-14e can be configured as individual elements or can be configured as arrays of cooperating elements. In the illustrated embodiment, the sensors 14a-14e have the form of radar, lidar, sonar and the like. The sensors 14a-14e can be positioned in any desired external location on the vehicle 10. It is further contemplated that a desired quantity of sensors can be positioned internal to the vehicle 10.

Figure 3:
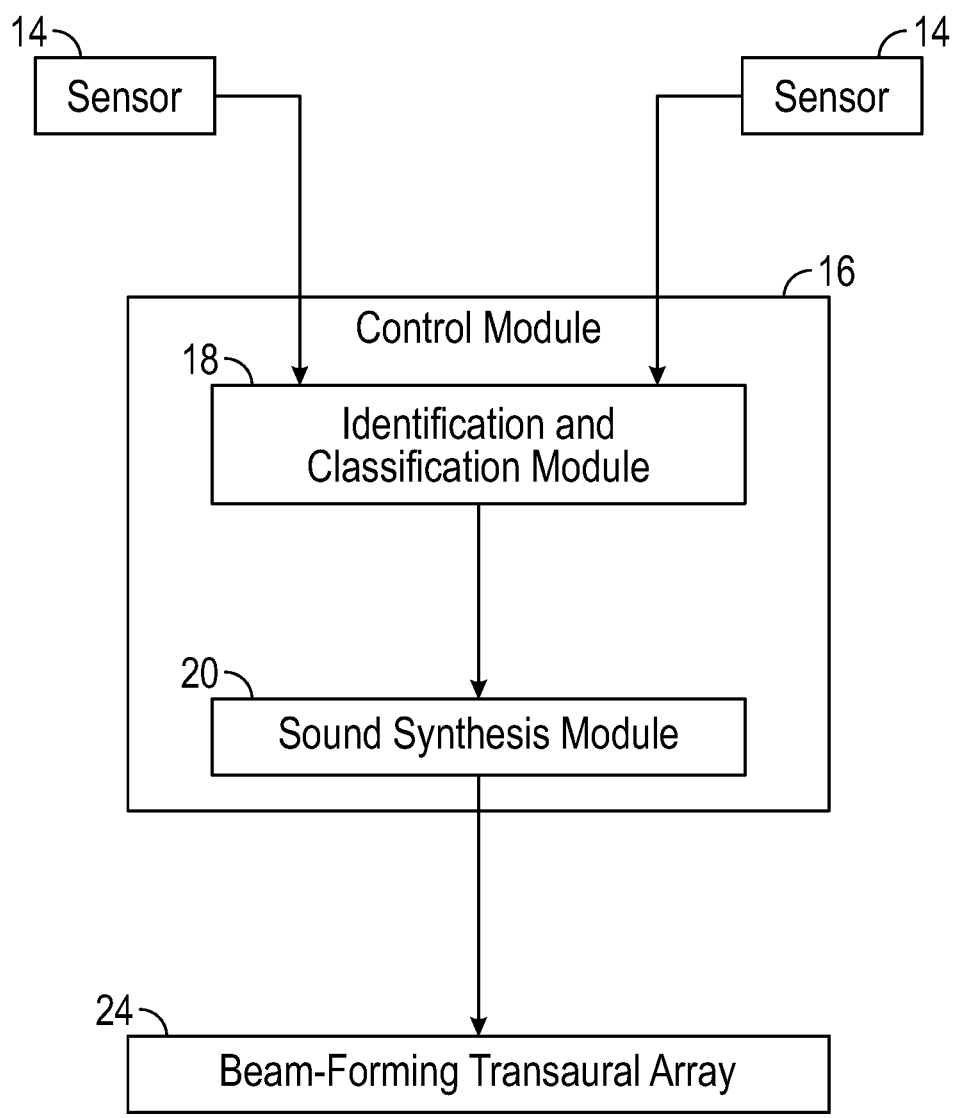
FIG. 3 is a schematic view of the elements of the situation awareness system of FIG. 1.

Referring now to FIGS. 2 and 3, the vehicle 10 further includes a control module 16. The control module 16 includes an identification and classification module 18 and a sound synthesis module 20. In certain embodiments, the identification and classification module 18 and the sound synthesis module 20 can be incorporated into the control module 16 as software-based elements. In other embodiments, the identification and classification module 18 and the sound synthesis module 20 can be incorporated into the control module 16 as discrete physical elements. In still other embodiments, the classification module 18 and the sound synthesis module 20 can be incorporated into the control module 16 as a combination of software-based elements and discrete physical elements.

Referring now to FIGS. 1-3, the identification and classification module 18 is configured for several functions. First, the identification and classification module 18 is configured to receive the signals generated by the sensors 14a-14e. Second, the identification and classification module 18 is configured to analyze the raw signals received from the sensors 14a-14e. Third, the identification and classification module 18 is configured is identify an object 22 using the raw signals received from the sensors 14a-14e, such as for example, a bicycle located in the roadway 12. While the object 22 is identified as a bicycle, in other embodiments, the identification and classification module 18 can be configured to identify other objects, including the non-limiting examples of automobiles, people, animals and the like. Finally, the identification and classification module 18 is configured to determine the position, speed and direction of each identified object using the raw signals received from the sensors 14a-14e.

Referring again to FIGS. 1-3, the sound synthesis module 20 is configured to receive the identifying information as well as the position, speed and direction of each identified object information from the identification and classification module 18. Using this information, the sound synthesis module 20 is further configured for several functions. First, the sound synthesis module 20 is configured to create different sorts of sounds for each object 22 or sound source. Second, given the positional data, sound classification and sound synthesized for each object or sound source, a binaural virtual acoustic model is created and used to position the object or sound source in virtual space at a location corresponding to its location in real space. Third, the sound synthesis module 20 creates signals of the positioned objects or sound sources for delivery to beam forming arrays 24.

Referring now to FIGS. 1-3, the identification and classification module 18 is configured for several functions. First, the identification and classification module 18 is configured to receive the signals generated by the sensors 14a-14e (genericized as "sensors 14" in FIG. 3). Second, the identification and classification module 18 is configured to analyze the raw signals received from the sensors 14a-14e. Third, the identification and classification module 18 is configured is identify an object 22 using the raw signals received from the sensors 14a-14e, such as for example, a bicycle located in the roadway 12. While the object 22 is identified as a bicycle, in other embodiments, the identification and classification module 18 can be configured to identify other objects, including the non-limiting examples of automobiles, people, animals and the like. Finally, the identification and classification module 18 is configured to determine the position, speed and direction of each identified object using the raw signals received from the sensors 14a-14e.

Figure 4:
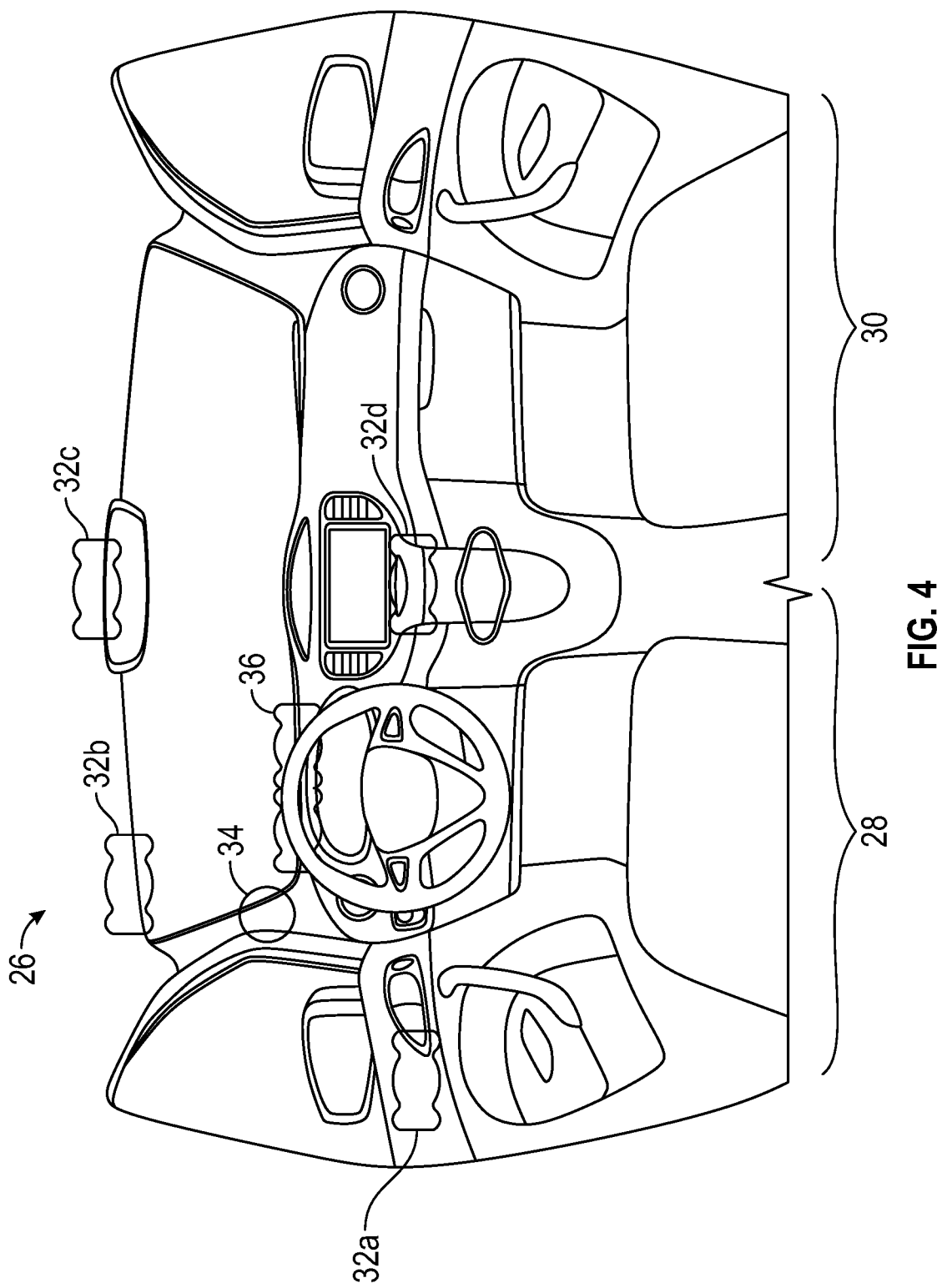
FIG. 4 is a perspective view of an interior portion of a vehicle illustrating portions of the situation awareness system of FIG. 1.

Referring again to FIG. 4, to improve localization, the binaural signals are personalized to the driver's individual anthropomorphic features extracted from an extant sensing camera 34 positioned within the interior portion 26 of the vehicle. Advantageously, the personalized binaural signals result in improved congruence between the objects 22 or sound sources and the synthesized sounds.

Referring again to FIG. 4, to ensure a high fidelity and positionally accurate localization, the acoustic transfer function is removed between the beam-forming arrays 32a-32d and the listener's ears (not shown). This removal is configured to mitigate the elevation cues corresponding to the location of the arrays 32a-32d. Instead, it is desired that the listener (driver) experience the elevation cues synthesized by the binaural virtual acoustic model corresponding to the location of the externally sensed objects 22.

Figure 5:
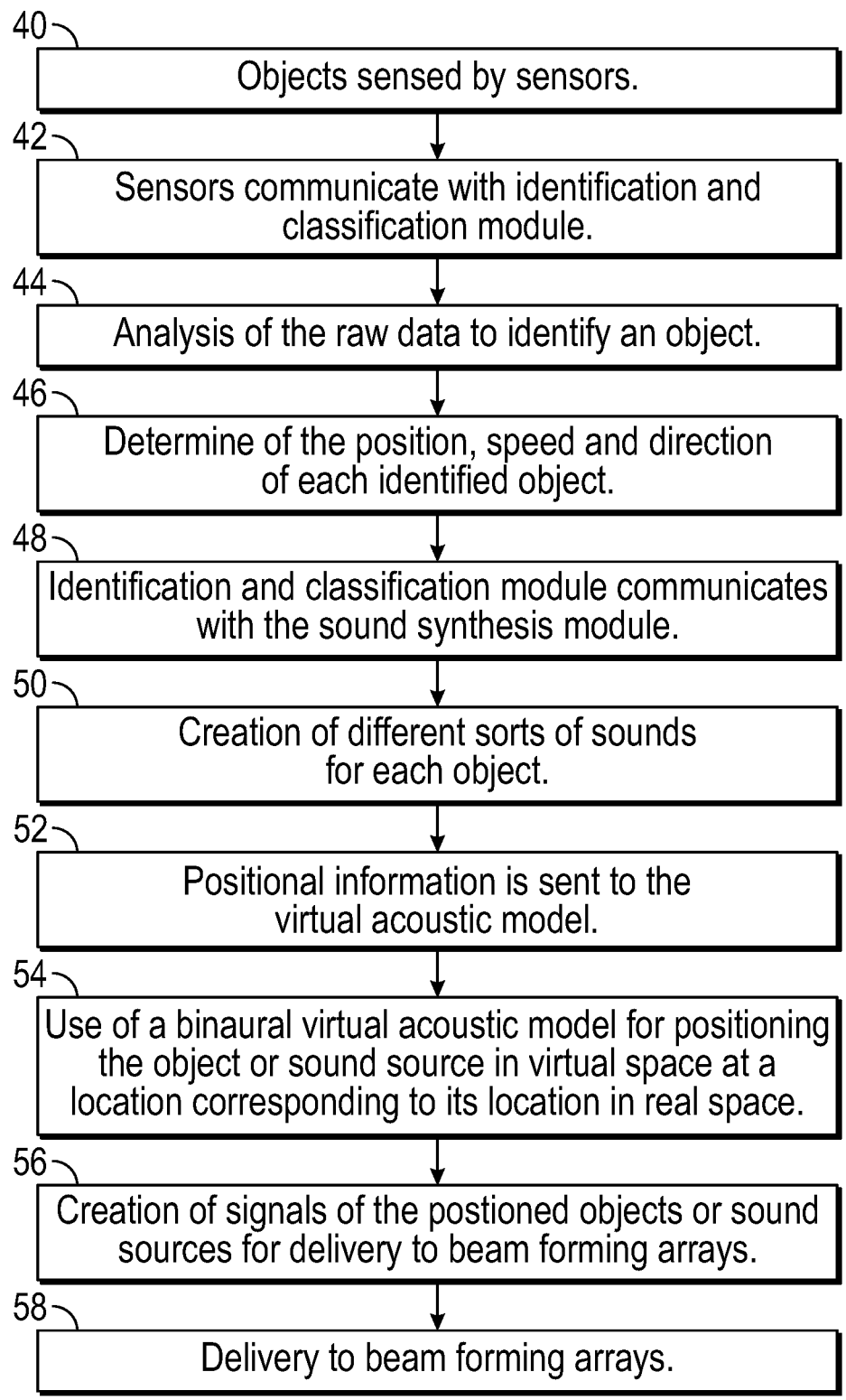
FIG. 5 is a flow chart illustrating the operation of the situation awareness system of FIG. 1.

Referring now to FIG. 5, the mode of operation of the situational awareness system will be briefly described. In an initial step 40, the objects 22 are sensed by one or more of the sensors 14a-14e. In a second step 42, the one or more sensors 14a-14e communicate with the identification and classification module 18. In a next step 44, the identification and classification module 18 analyses the raw signals received from the by one or more of the sensors 14a-14e to identify the object 22. Next, in step 46, the identification and classification module 18 determines the position, speed and direction of each identified object 22. In a next step 48, the identification and classification module 18 communicates with the sound synthesis module 20. Next, in step 50, the sound synthesis module 20 creates different sorts of sounds for each object 22. In a next step 52, positional information is sent to the virtual acoustic model. In a next step 54, a binaural virtual acoustic model is used for positioning the object or sound source in virtual space at a location corresponding to its location in real space. Next, in step 56, signals are created for the positioned objects or sound sources for delivery to beam forming arrays 32a-32d. In a final step 58, the signals are delivered to the beam-forming arrays 32a-32d.

Figure 6:
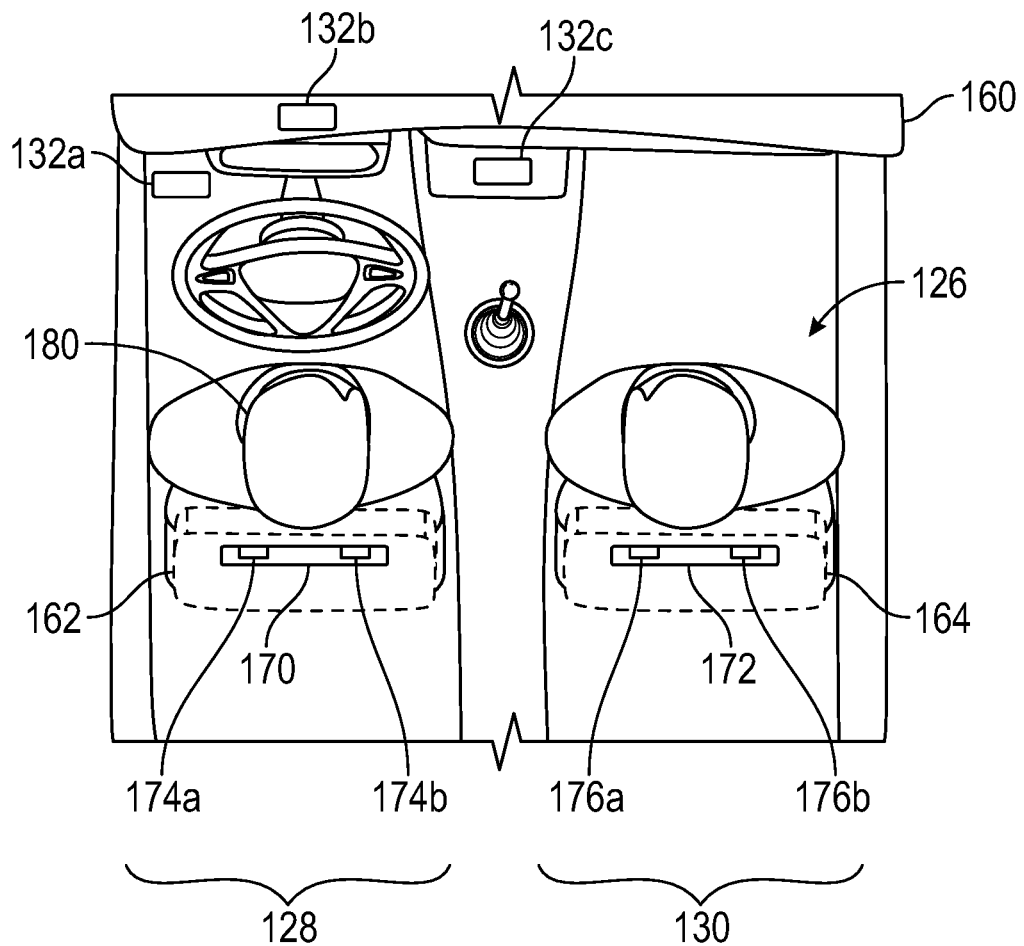
FIG. 6 is a schematic plan view of an interior portion of a vehicle, illustrating an augmentation of beam-forming arrays with loudspeakers positioned in headrests.

Referring now to FIG. 6, another embodiment is illustrated. In this embodiment, an interior portion 126 of a vehicle includes a driver section 128 and an adjacent passenger section 130. The interior portion 126 further includes a vehicle dashboard 160 having a plurality of beam-forming arrays 132a-132c. In the illustrated embodiment, the beam-forming arrays 132a-132c are the same as, or similar to the beaming-form arrays 32a-32d shown in FIG. 4 and described above. However, in other embodiments the beam-forming arrays 132a-132c can be different from the beam-forming arrays 32a-32d.

Referring again to FIG. 6, the interior portion 126 include a driver's seat, shown schematically at 162, and a passenger seat shown schematically at 164. The driver's seat 162 includes a driver's headrest 170 and the passenger seat 164 includes a passenger headrest 172, both of which are configured as is known in the art. The driver's headrest 170 includes a plurality of loudspeakers 174a, 174b and the passenger headrest 172 includes a plurality of loudspeakers 176a, 176b.

Referring again to FIG. 6, the beam-forming arrays 132a-132c are configured for augmentation by the plurality of driver loudspeakers 174a, 174b positioned behind the driver's head 180. In this embodiment, a crossover network is used to send high-frequency content to the beam-forming arrays 132a-132c and low-frequency content to the driver loudspeakers 174a, 174b. The passenger section 130 can be configured in a similar manner with a plurality of passenger side beam-forming arrays (not shown for purposes of clarity) and the passenger loudspeakers 176a, 176b. While the loudspeakers 174a, 174b, 176a, 176b are shown as being positioned in the headrests 162, 164, it is contemplated that the loudspeakers 174a, 174b, 176a, 176b can be positioned in other locations, suitable to augment the plurality of beam-forming arrays 132a-132c as described herein.

The situational awareness system provides many benefits, although all benefits may not be present in all embodiments. First, the situational awareness system is configured to protect active noise cancellation of any internal or external stimuli. Second, the situational awareness system is configured to protect acoustic augmented reality, that is, the situational awareness system is configured to binauralize, amplify, attenuate, and replace with a sound-icon any internal or external stimuli. Third, the situational awareness system includes manual or automatic localization of sounds by purpose or class, in order to increase the amount of simultaneous stimuli that can be understood at once. Fourth, the content relating to situational awareness may or may not be based on input from sensors. In alternate embodiments, the content may originate more generally from any stage in the signal flow diagram on FIG. 5. For example, the "sound synthesis module" may generate any sort of content without the use of sensors. Fifth, other sources, including the non-limiting examples of devices like the radio, phone, car's onboard computer, may also count as sensors or sources of situational awareness content that can influence or control any part of the signal flow diagram described by FIG. 5. Sixth, users, including the driver and passengers may also count as sensors or sources of situational awareness content that can influence or control any part of the signal flow diagram described by FIG. 5. Finally, any signal processing or audio technique that increases the ability of the signal flow diagram described by FIG. 5 to aid in situational awareness can influence or control any part of the system. This includes the non-limiting examples of elevation cues, head-related transfer functions (HRTFs), other parts of a beamforming system, customized HRTFs concerning intended listeners and the like.

In accordance with the provisions of the patent statutes, the principle and mode of operation of the situational awareness system have been explained and illustrated in certain embodiments. However, it must be understood that the situational awareness system may be practiced otherwise than as specifically explained and illustrated without departing from its spirit or scope.

What is claimed is:

1. A situation awareness system configured to create a binaural virtual acoustic model of a sensed object, the situation awareness system comprising:
   one or more sensors configured to sense an object and generate signals of the sensed object;
   an identification and classification module in communication with the one or more sensors, the identification and classification module configured to identify the sensed object and further configured to determine a position, speed and direction of each sensed object;
   a sound synthesis module in communication with the identification and classification module, the sound synthesis module configured to create sounds for the sensed object and further configured to create the binaural virtual acoustic model for the sensed object, the binaural virtual acoustic model being used to position the sensed object in virtual space at a location corresponding to its location in real space;
   one or more beam forming arrays in communication with the sound synthesis module and configured to deliver sound; and
   a plurality of loudspeakers located in a driver's headrest, wherein:
   the plurality of loudspeakers is separate and distinct from the one or more beam forming arrays;
   low-frequency content of the binaural virtual acoustic model is output via the plurality of loudspeakers and high-frequency content of the binaural virtual acoustic model is not output via the plurality of loudspeakers; and
   the high-frequency content of the binaural virtual acoustic model is output via the one or more beam forming arrays based on the binaural virtual acoustic model and the low-frequency content of the binaural virtual acoustic model is not output via the one or more beam forming arrays.

2. The situation awareness system of claim 1, wherein the one or more beam forming arrays includes a network of loudspeaker systems including single-channel and multi-channel loudspeaker systems.

3. The situation awareness system of claim 1, wherein the identification and classification module and the sound synthesis module are software based elements.

4. The situation awareness system of claim 1, wherein the identification and classification module and the sound synthesis module are formed as a combination of software based elements and discrete physical elements.

5. The situation awareness system of claim 1, wherein the one or more sensors are positioned on a vehicle and the sensed object is in a roadway.

6. The situation awareness system of claim 1, wherein the one or more sensors have the form of radar.

7. The situation awareness system of claim 1, wherein the one or more beam forming arrays are positioned above, forward and/or adjacent to a vehicle operator.

8. The situation awareness system of claim 1, wherein the one or more beam forming arrays are positioned in a dashboard of a vehicle.

9. The situation awareness system of claim 1, wherein an extant sensing camera is used to personalize binaural signals to a vehicle operator's individual anthropomorphic features.

10. A method of operating a situation awareness system, comprising the steps of:
sensing an object using one or more sensors, the one or more sensors generating a sensing signal;
analyzing the sensing signal to identify the object;
determining a position, speed and direction of the object;
creating one or more sounds for the object;
sending positional information for the object to a virtual acoustic model;
positioning a virtual object that corresponds to the object in virtual space at a location corresponding to its location in real space;
creating signals for the positioned virtual object for delivery to one or more beam-forming arrays; and
delivering the signals to the one or more beam-forming arrays and a plurality of loudspeakers, wherein:
the plurality of loudspeakers is located in a driver's headrest;
the plurality of loudspeakers is separate and distinct from the one or more beam forming arrays;
low-frequency content of the virtual acoustic model is output via the plurality of loudspeakers and high-frequency content of the virtual acoustic model is not output via the plurality of loudspeakers; and
the high-frequency content of the virtual acoustic model is output via the one or more beam-forming arrays based on the virtual acoustic model and the low-frequency content of the virtual acoustic model is not output via the one or more beam forming arrays.

11. The method of claim 10, wherein an identification and classification module is used to determine the position, speed and direction of the object.

12. The method of claim 10, wherein a sound synthesis module is used to communicate the identity, position, speed and direction of the object.

13. The method of claim 10, wherein the virtual acoustic model is used to position the object in virtual space at a location corresponding to its location in real space.

* * * * *